Feb. 1, 1949. J. BRISKIN 2,460,619
FILM SPLICER
Filed Oct. 26, 1945 7 Sheets-Sheet 1
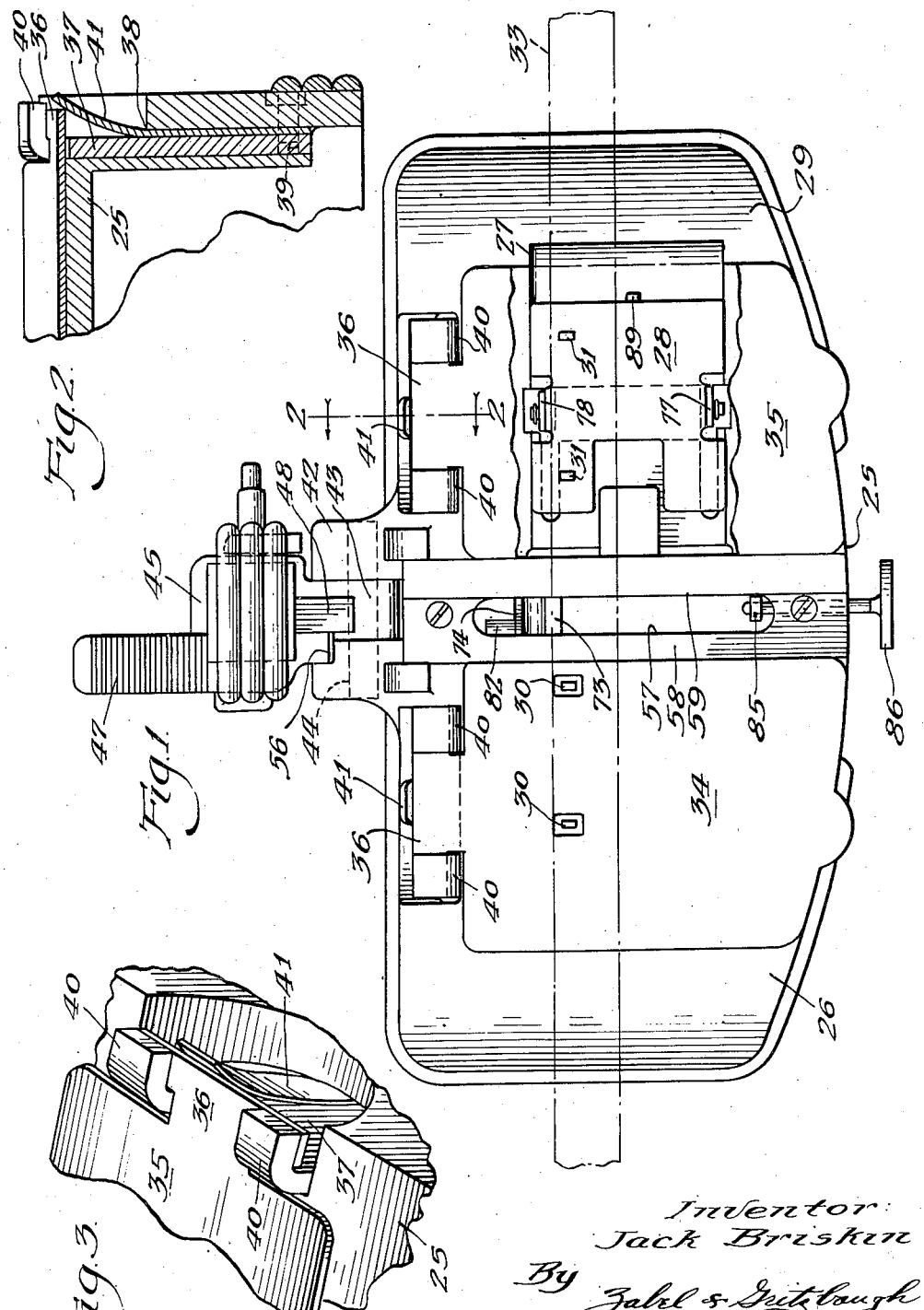
Inventor:
Jack Briskin
By Zabel & Gritzbaugh
Attorneys Feb. 1, 1949. J. BRISKIN 2,460,619
FILM SPLICER
Filed Oct. 26, 1945 7 Sheets-Sheet 2

Inventor:
Jack Briskin
By Zahel & Gritzbaugh
Attorneys

Feb. 1, 1949.    J. BRISKIN    2,460,619
FILM SPLICER
Filed Oct. 26, 1945    7 Sheets-Sheet 3
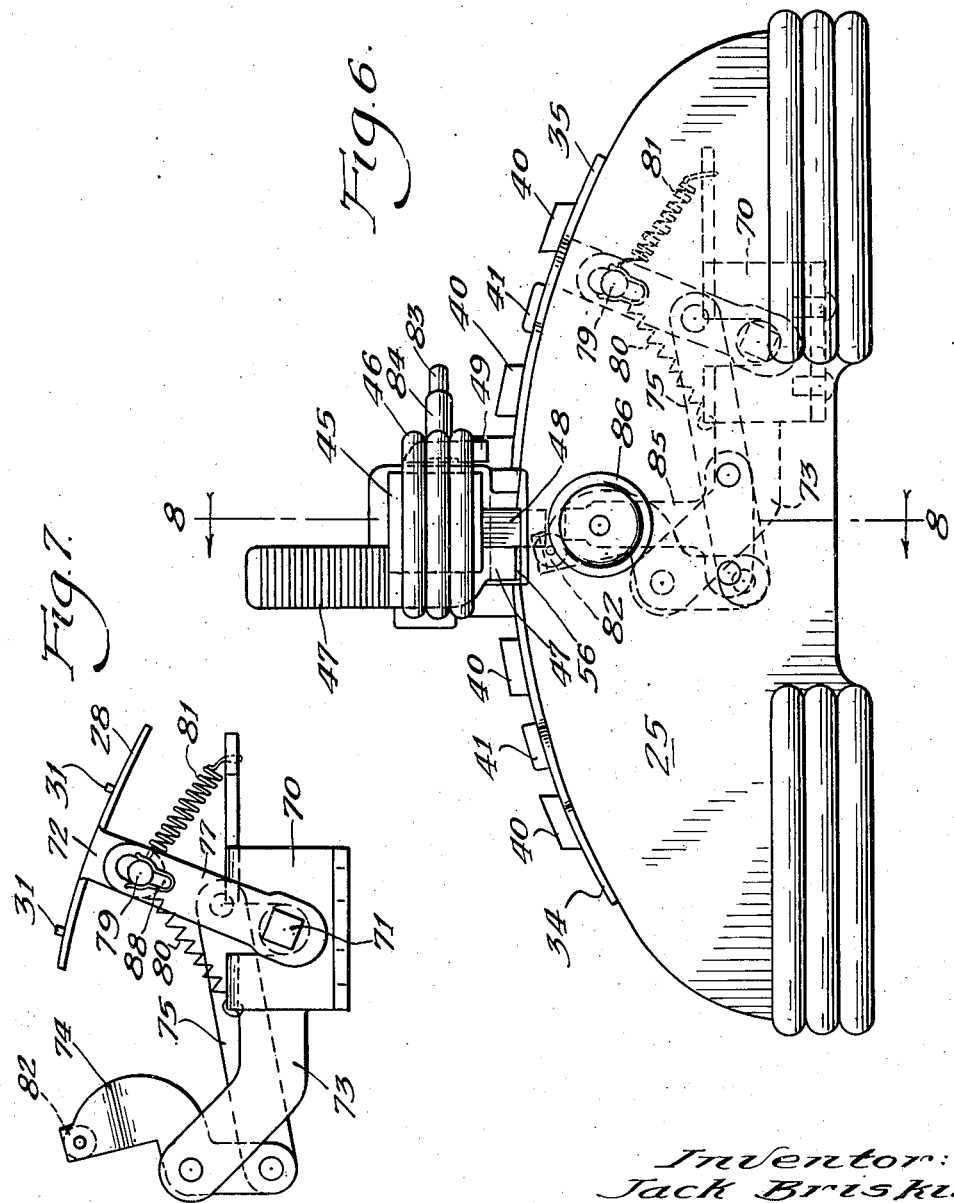
Inventor:
Jack Briskin
By:
Zabel & Fitzbaugh
Attorneys Feb. 1, 1949.   J. BRISKIN   2,460,619
FILM SPLICER
Filed Oct. 26, 1945   7 Sheets-Sheet 4
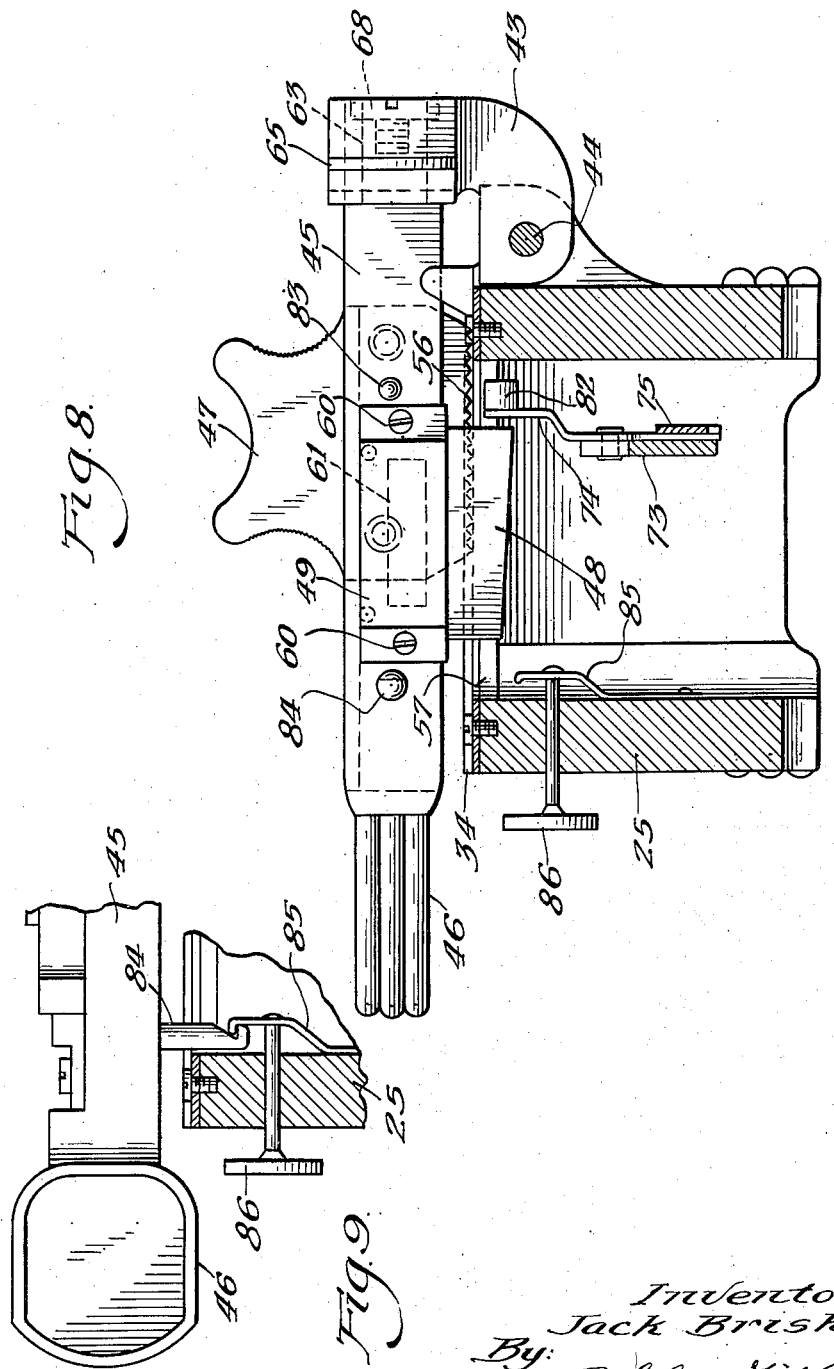
Inventor:
Jack Briskin
By Zabel & Fitzhugh
Attorney

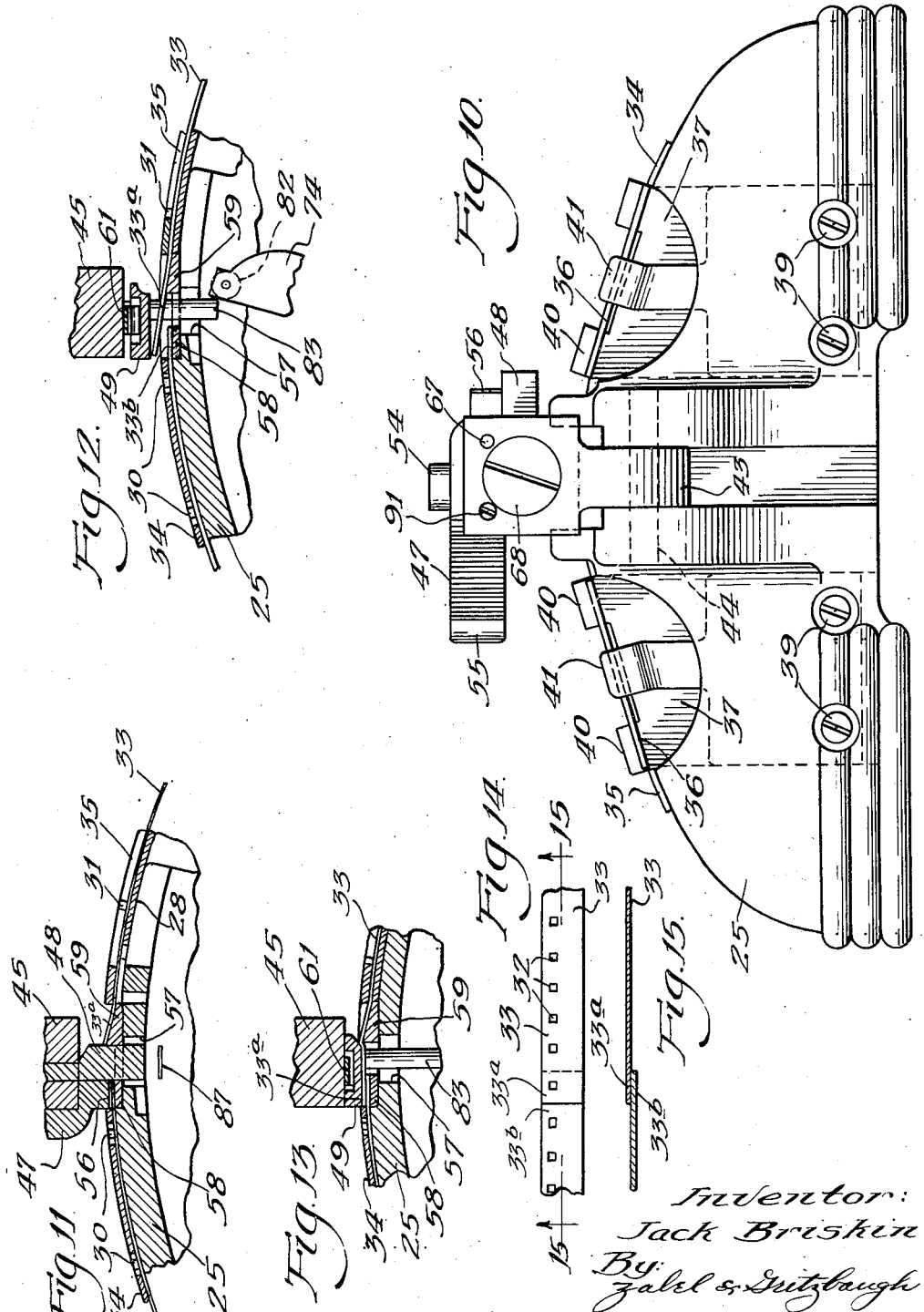

Feb. 1, 1949.   J. BRISKIN   2,460,619
FILM SPLICER
Filed Oct. 26, 1945   7 Sheets-Sheet 6
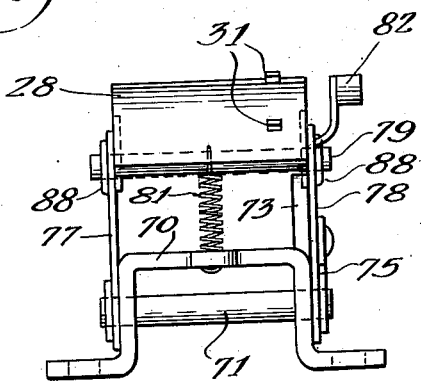
Fig. 17.
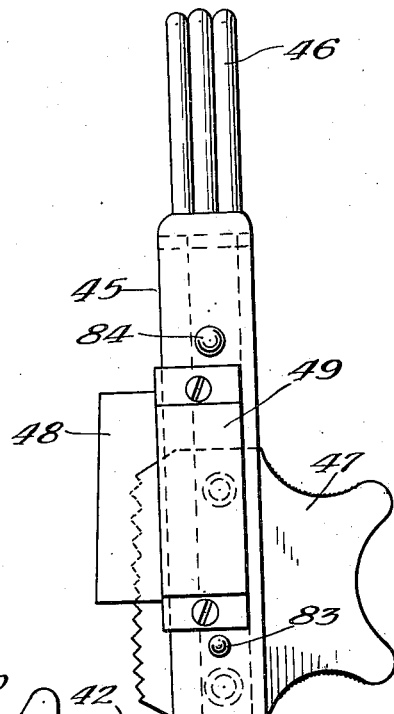
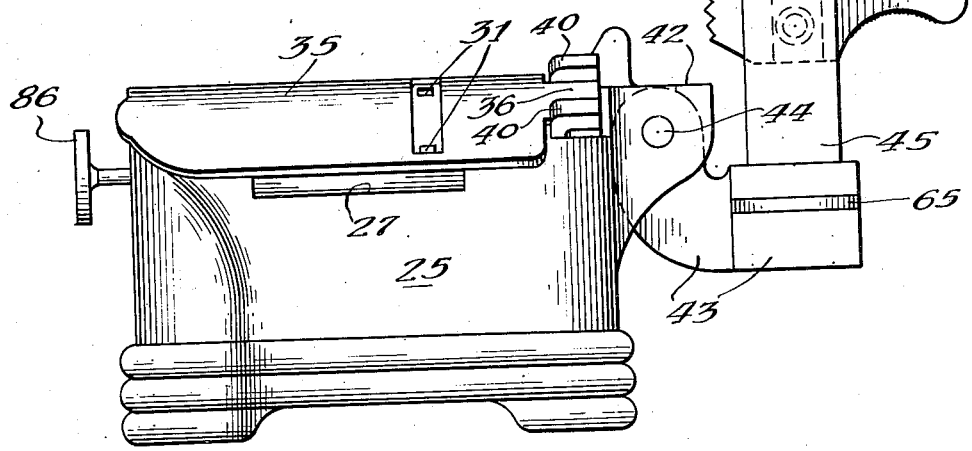
Fig. 16.
Inventor
Jack Briskin
By Zabel & Fitzbaugh
Attorneys

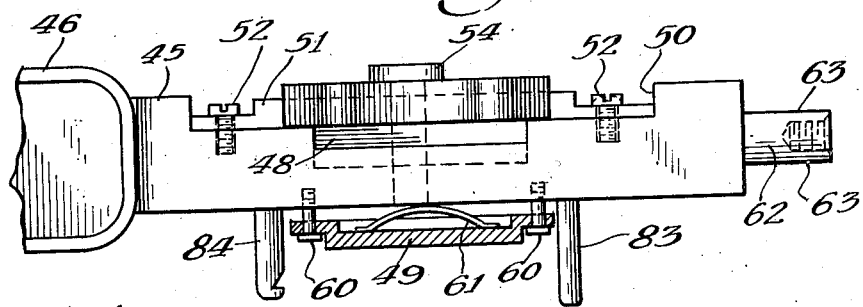
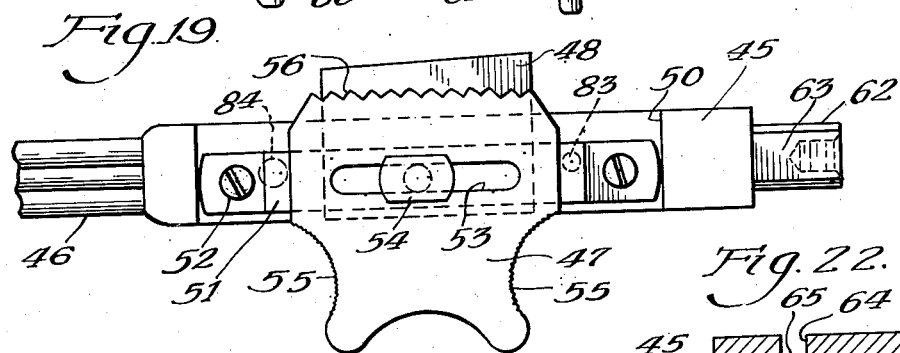
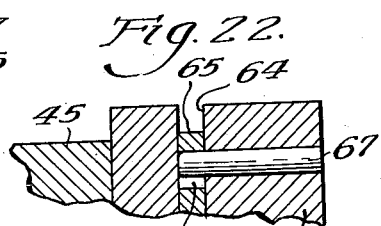
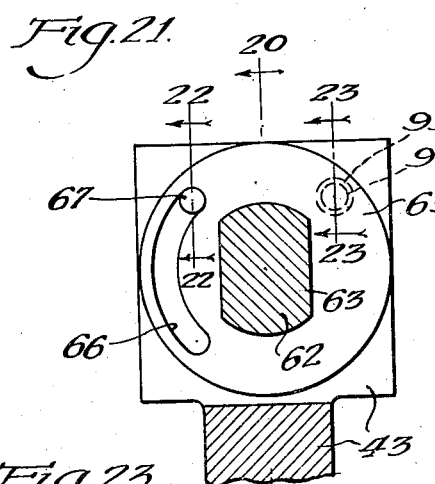
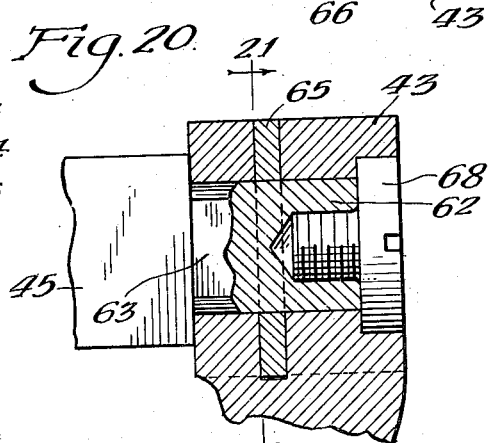
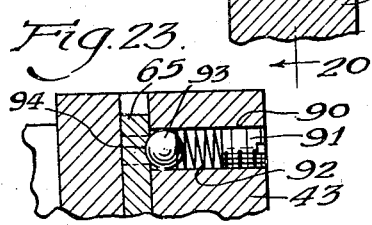

Patented Feb. 1, 1949

2,460,619

UNITED STATES PATENT OFFICE 2,460,619

FILM SPLICER

Jack Briskin, Chicago, Ill., assignor to Revere Camera Company, Chicago, Ill., a corporation of Delaware Application October 26, 1945, Serial No. 624,818

10 Claims. (Cl. 154—42.2)

This invention relates to an improved film splicer.

A film splicer is a device which is used in connection with a motion picture film to remove one or more frames which may be damaged, the removal being accomplished by cutting the film, and then by gluing together the cut ends to again form a continuous strip. Previous devices of this sort have included a pair of shear blades which have been spaced from each other a considerable distance so that several frames are removed. This is undesirable where only one frame has been damaged, as by burning or tearing, inasmuch as it tends to create a jumpy picture when the film, after the ends are glued together, is projected.

It is an object of this invention to provide an improved film splicer which is provided with a single blade having two shearing edges, the width of the blade being the width of the single frame, so that only one frame may be removed.

It is a further object of this invention to provide an improved film splicer, the film table of which presents a curved surface, thereby permitting the film to rest against the surface throughout the various operations. Thus, the width of the removed portion of film, and the distance through which one portion of the film may be advanced preparatory to the gluing operation, can be more readily controlled, for the reason that the film has a tendency to curl, and when rested on a flat surface, this tendency to curl introduces certain errors in the operation of the device.

A still further object is to provide a film splicer which is compact in its arrangement, and provides means for cutting and scraping the film, and for facilitating the step of gluing together the ends of the severed film.

A further object is to provide in a film splicer improved means for advancing one portion of the severed film a predetermined distance so that the cut edge will overlap the cut edge of the other portion of the film, by a predetermined amount, and to apply a uniform pressure to the overlapping edges while the glue sets.

Another object is to provide an improved combination of curved film platens and curved film table, together with an improved hinge connection between the two which permits the proper seating of the curved platen on the curved film table.

Still another object is to provide, in a film splicer an improved cutter arm which also embodies scraping means and pressing means, and which also serves to actuate the film advancing means.

A still further object is to provide in a film splicer of the type indicated, means for automatically advancing the film into splicing position as the parts are brought into pressure applying position.

Other objects, features and advantages of this invention will become apparent as the description proceeds.

With reference now to the drawings, in which like reference numerals designate like parts—

Fig. 1 is a plan view of a preferred embodiment of this invention, with a portion of the platen broken away, and showing the operating arm in raised position;

Fig. 2 is a detailed section taken along line 2—2 of Fig. 1;

Fig. 3 is a detailed perspective view showing the parts of Fig. 2;

Fig. 4 is a sectional elevation of the device shown in Fig. 1, but with the operating arm in its lowered pressing position;

Fig. 5 is a detailed view showing in plan, the mechanism for displacing the film carrier plate;

Fig. 6 is an elevation showing the operating arm in cutting and scraping position;

Fig. 7 is an elevation of the mechanism shown in Fig. 5;

Fig. 8 is a section taken along the line 8—8 of Fig. 6;

Fig. 9 is a detail view showing the arm of Fig. 8 in changed position;

Fig. 10 is a rear elevation, the parts being in the same position as shown in Fig. 4;

Figs. 11, 12 and 13 are detailed sections showing the changed positions of the operating arm;

Fig. 14 is a plan view of a film after it has been spliced;

Fig. 15 is a sectional view taken along line 15—15 of Fig. 14;

Fig. 16 is an end view of the device shown in Fig. 1;

Fig. 17 is an end view of the mechanism shown in Figs. 5 and 7;

Figs. 18 and 19 are plan views of the operating arm in scraping and pressing positions, respectively;

Fig. 20 is an enlarged sectional detail of the swivel connection between the operating arm and the bracket on which it is mounted;

Fig. 21 is a section taken along line 21—21 of Fig. 20;

Fig. 22 is a section taken along line 22—22 of Fig. 21; and

Fig. 23 is a section taken along line 23—23 of Fig. 21.

With reference now to Figs. 1 and 4, the reference numeral 25 designates the body member of the splicer. This is preferably in the form of a hollow die casting, the upper portion of which presents a curved surface, over which a strip of motion picture film is adapted to lie. The lefthand portion of the curved surface as viewed in Figs. 1 and 4, constitutes a film table 26, and the right hand portion provides a film table 29. The latter is recessed as indicated by the reference numeral 27, and a film carrier plate 28 is slidably disposed in the recess and forms a portion of the film table 29. Lugs 30 and 31, which are adapted to project through the apertures 32 in a strip of motion picture film 33, as shown in Fig. 14, are provided on film tables 26 and 29, respectively. The lugs 31 are carried by the film carrier plate 28.

Platens 34 and 35 are hingedly mounted at the rear edges of the film tables, so that they may be elevated to permit the positioning of a strip of film on the film tables, with the lugs 30 and 31 projecting through the apertures 32 of the film. The platens are provided with suitable apertures through which the lugs may extend, as shown in Fig. 4. When the platens are returned to their superimposed position, as shown in Figs. 1 and 4, it will be seen that the film is confined between the film tables and the platens.

The platens are also curved so as to conform to the curvature of the film tables, and the hinged connection between the two is such that the platens are permitted a certain amount of play, so that they will seek the proper positioning. This hinged connection, as shown in Figs. 2 and 3, with respect to platen 35 comprises a T-shaped portion 36 at the rear edge of the platen. A vertically disposed plate 37 is received within a slot 38 in the body member 25, and is secured in place by screws 39, as shown in Fig. 10. The upper portion of the plate 37 is provided with bent over lugs 40 which engage the projecting arms of the T-shaped portion 36, so that the platen 35 is mounted in interlocking position with respect to the plate 37, but a position which permits pivotal movement of the plate. A leaf spring 41, also secured in the slot 38 by means of screws 39, engages the rear edge of the T-shaped portion 36, to the end that an overcenter action may be provided which will serve to maintain the platen 35 either in an elevated position or in the superimposed position shown in Fig. 2.

A slotted bracket 42 is disposed at the rear portion of the body portion 25, as shown in Figs. 1 and 10, and a pivoted member 43 is carried on the slotted bracket by means of a pin 44. An operating arm 45 is swivelly mounted on the pivoted member 43, as will be pointed out hereinafter in greater detail. The operating arm carries a finger engaging handle 46, a slidable scraper 47, a shear blade 48 and a presser 49.

As shown in Figs. 4 and 18, one surface of the operating arm 45 is recessed as indicated by the reference numeral 50. A guide 51 is disposed in the recess and is secured to the operating arm by means of screws 52. The shear blade 48 is confined between the guide 51 and the operating arm 45. The scraper 47 is provided with a groove which fits over the guide 51 to the end that the scraper may be slid longitudinally of the arm 45. A slot 53 extends through the scraper 47, and a bolt 54 passes through the slot and through the guide 51 and shear blade 48 and takes into the arm 45, the bolt serving to confine the scraper in position on the guide 51. The scraper 47 also is provided with a finger engaging portion 55, by means of which the operator can move it back and forth and with a roughened or abrasive surface 56, which is adapted to contact a portion of the surface of a film which is disposed on the film table 26, and scrape the emulsion therefrom preparatory to the application of glue or other adhesive.

The body member 25 is provided with a slot 57, as shown in Fig. 11, through which the shear blade 48 may project when the arm is brought down into horizontal position. Shear plates 58 and 59 are provided at either side of the slot 57, and cooperate with the shear blade 48 to permit a section of film 87 to be cut out of the film strip 33. The width of the blade 48 is equal to the width of one frame of the film. In the position of the parts shown in Fig. 11, it will be seen that the scraper 47 contacts the upper surface of the film 33 immediately adjacent the removed portion 87. The presser plate 49 is mounted on the side surface of the arm 45, when the arm is in the position shown in Figs. 6 and 11, by means of screws 60. A spring 61 serves to bias the presser away from the arm, so that when the arm is rotated on its longitudinal axis, through 90 degrees and brought down into horizontal position, as shown in Figs. 12 and 13, the presser plate will exert a uniform pressure downwardly against the film.

As shown in Figs. 18 and 19, the arm 45 is provided with a reduced cylindrical end 62 which is slabbed as indicated by the reference numeral 63 in Fig. 21. This slab end 62 is received within a cylindrical bore in the pivoted member 43, the latter also being provided with a slot 64. A washer 65 is disposed within the slot 64, and the central opening of the washer conforms to the shape of the slabbed end 62, so that the washer is keyed thereto. An arcuate shaped slot 66 is provided in the washer 65 and extends through an arc of 90 degrees. A pin 67 is disposed within a bore in the pivoted member 43 and extends into the slot 66 to confine the twisting movement of the arm 45 to 90 degrees. A screw 68 takes into the end 62, the head of the screw engaging the pivoted member 43 in a recessed portion, so that the arm 45 may be secured to the pivoted member 43.

In operation it will be seen that the arm 45 may be twisted so that either the shear blade 48 and the scraper 47 are in film contacting position, as shown in Fig. 11, or so that the presser 49 is in film engaging position, as shown in Figs. 12 and 13. A ball click 93, engaging alternatively a depression 94 in washer 65, or the end of slot 66, serves to maintain the arm in one or the other of these positions. The ball click 93 is disposed in a bore 90 in the pivoted member 43, and confined by set screw 91 and spring 92, as shown in Fig. 23.

Means are provided to advance the carrier plate 28 automatically as the arm 45 is brought into the position shown in Fig. 12, so that the portion 33a of the film 33 will be advanced from the position shown in Fig. 11 to the position shown in Fig. 12, in which it overlaps the portion 33b. This means includes a U-shaped frame member 70 which may be suitably secured to a downwardly facing shoulder formed in the interior of the body member 25. A shaft 71 is mounted in the vertically disposed portions of the U-shaped member 70, these parts being shown in Figs. 4, 5, 7 and 17. The carrier plate 28 is provided with two downwardly extending lugs 72 and 76, which are engaged by a cross bar 79.

Arms 77 and 78 are pivotally mounted on the shaft 71, and at their upper portions are slotted to receive the ends of cross bar 79. The parts are secured together by spring clips 88, which snap into suitable grooves in the cross bar. Thus, while the carrier plate is mounted for pivotal movement about the shaft 71, it is also permitted a certain amount of play with respect to arms 77 and 78, on which it is mounted. This is occasioned by the fact that the curved surface over which the carrier plate 28 slides, has a radius greater than the distance between the surface and the shaft 71. A spring 80 is tensioned between a portion of the U-shaped frame 70 and the cross bar 79, so that the carrier plate 28 is urged downwardly against the recessed surface of the film table 29. Another spring 81, stronger than spring 80, urges the carrier plate 28 in a clockwise direction, as viewed in Fig. 7.

The U-shaped frame member 70 is provided with an extension 73 on which is pivoted a lever 74. A link 75 extends between the lower end of the lever 74 and the arm 77, so that depression of the top portion of lever 74 will cause the carrier plate 28 and its associated parts to be moved in a counterclockwise direction against the bias of the spring 81. The upper portion of lever 74 is provided with a roller 82 which extends into the path of a pin 83 which is carried by the arm 45. It will be seen that when the lever 45 has been twisted into pressing position, and is then brought down into film contacting position, the pin 83 will be projected through the slot 57, and engage the roller 82. Thus, the lever 74 is rocked and the portion 33a of the film is advanced so that it overlaps portion 33b.

The parts are so proportioned that the portion 33a reaches the limit of its movement slightly before the presser 49 engages the portion 33a, and forces it down against the portion 33b.

It will be noted that the shear plate 59 is provided with a slight upward lift, which serves to raise the portion 33a so that it will overlap the portion 33b, and not abut the same.

A latch is provided to lock the arm 45 in pressing position to permit the glue to set, this last being shown in Figs. 8 and 9. A latch pin 84 is carried on the arm 45 and is adapted to engage a latch spring 85 secured to the inner surface of the body member 25. A latch button 86 is slidably mounted in the body member and serves to displace the latch spring to release the arm.

The operation of the device has been described in detail in connection with the construction of the various portions thereof. When it is desired to remove a damaged frame from a strip of film 33, and splice the film together again, the film splicer is prepared for operation by elevating the arm 45 into its vertical position, as shown in Figs. 1 and 16. The platens 34 and 35 are then raised, and the strip of film 33 is disposed on the film tables 26 and 29, with the film apertures fitting over the lugs 30 and 31. The position of the film carrier plate 28 is determined by a stop 89, so that the distance between lugs 30 and 31 is a multiple of the distance between successive apertures 32 of the film. When the film has been properly positioned with the damaged frame overlying the slot 57, the platens 34 and 35 are brought down into horizontal position so that the film is confined to the table. The arm 45 is then swung downwardly so that the damaged frame 87 is sheared from the remainder of the film. While the arm is maintained in its lowered position, the operator reciprocates the scraper 47 which removes the emulsion from the portion 33b.

The arm is then raised to its vertical position, and twisted 90 degrees. Glue, or other adhesive, is applied to the scraped portion 33b and the arm 45 is again brought down. As the arm moves into its final position, as shown in Figs. 12 and 13, the portion 33a is automatically advanced so that it overlaps the scraped and glued portion 33b. After full contact has been made between the presser 49 and the overlapping portions, the arm 45 will be automatically locked in position, and pressure will continue to be exerted on the splice until such time as the operator feels that the glue has set. Pressure on the latch button 86 will release the arm, and then the arm may be again lifted to the vertical position. Withdrawal of the pin 83 from the lever 74 causes the tension of spring 81 to exert itself on the carrier plate 28. Thus the film is subjected to a tension as soon as the arm 45 has been raised. If the glue has not set properly, this tension will cause the portions 33a and 33b to separate. If the glue has set properly, the splice will withstand this tension. Thus an automatic test of the splice is provided without removing the film from the splicer. Removal is accomplished by elevating the platens 34 and 35 and disengaging the film from the lugs 30 and 31.

In the event that it is desired to break a given strip of film, and insert another strip, such a strip bearing a title, the first strip is inserted and cut, and scraped. Then the platen 35 can be elevated, and the end of the title strip substituted for that half of the strip which formerly rested on the film table 29. Then the splicing operation may proceed, after which the portion of the strip with the title attached is advanced over the splicer until the end of the title strip overlies the slot 57. Then the end of the title strip may be trimmed and scraped and the second half of the first strip of film may be placed in position, and spliced on to the scraped end of the title strip.

Although only a preferred embodiment of this invention has been shown and described herein, it will be understood that various modifications and changes may be made in the device shown without departing from the spirit of the invention as defined by the appended claims.

I claim:

1. A film splicer comprising a table upon which a strip of perforated film may be disposed, means disposed at opposite ends of said table and including lugs for interlocking with the perforations of said film for clamping two separate portions of said strip to said table, and means for performing a splicing operation on a portion of said film intermediate the portions engaged by said clamping means, said table presenting a curved surface whereby said intermediate portion of said film will lie closely against said table whereby the lugs on each of said oppositely disposed means engage the perforations of said film.

2. A film splicer comprising a table upon which a strip of film may be disposed, means for clamping two separate portions of said strip to said table, a slot in said table intermediate said clamping means, shear plates disposed at either side of said slot, and lying substantially flush with the surface of said film table, and a blade pivotally mounted on said table and provided with two shearing edges for cooperation with said shear plates, said table presenting a curved surface whereby the intermediate portion of said film will lie closely against said shear plates.

3. In a film splicer, a base, separate means on said base for holding two strips of film in longitudinally spaced relationship, one of said film holding means being shiftable into a splicing position to cause the edges of said strips to overlap each other, means biasing said shiftable film holding means out of splicing position, movable presser means pivotally mounted on said base transversely of said film to exert downward pressure on said overlapping edges, and actuating means disposed in the path of said movable presser means and adapted to be engaged thereby for automatically shifting said film holding means into said splicing position as said presser means is brought into operative position.

4. A film splicer comprising an apertured base, film holding means disposed on the upper surface of said base at either side of said aperture, one of said film holding means comprising a plate slidably mounted on said upper surface for longitudinal displacement from a normal position into splicing position, a lever pivoted on said base and connected to said plate, an arm pivoted on said base for movement in a plane perpendicular to the longitudinal axis of said base, and capable of being swung from an inoperative position to an operative position in which it overlies said aperture, a projection carried by said arm and adapted to extend into said aperture as said arm is being swung into said operative position, and means disposed beneath said upper surface and projecting into the path of said projection and adapted to be engaged thereby to cause rotation of said lever whereby said plate is displaced into splicing position as said arm is brought into operative position.

5. A film splicer comprising an apertured base, film holding means disposed on the upper surface of said base at either side of said aperture, one of said film holding means comprising a plate slidably mounted on said upper surface for displacement from a normal position into splicing position, a spring biasing said plate into normal position, a shaft disposed in said base below said upper surface, a lever pivoted on said shaft and connected to said plate to permit longitudinal movement of said plate with respect to said lever, an arm pivoted on said base for movement in a plane perpendicular to the longitudinal axis of said base, and capable of being swung from an inoperative position to an operative position in which it overlies said aperture, a projection carried by said arm and adapted to extend into said aperture as said arm is being swung into said operative position, and means disposed beneath said upper surface and projecting into the path of said projection and adapted to be engaged thereby to cause rotation of said lever whereby said plate is displaced into splicing position as said arm is brought into operative position.

6. A film splicer comprising an apertured base, film holding means disposed on the upper surface of said base at either side of said aperture, one of said film holding means comprising a plate slidably mounted on said upper surface for longitudinal displacement from a normal position into splicing position, an arm pivoted on said base for movement in a plane perpendicular to the longitudinal axis of said base, and capable of being swung from an inoperative position to an operative position in which it overlies said aperture, a projection carried by said arm and adapted to extend into said aperture as said arm is being swung into said operative position, actuating means disposed beneath said upper surface and projecting into the path of said projection and adapted to be engaged thereby to cause displacement of said plate into splicing position as said arm is brought into operative position, and a presser member resiliently mounted on said arm and adapted to press together the overlapping edges of two film strips held by said holding means after said plate has been displaced into splicing position.

7. A film splicer comprising an apertured base, film holding means disposed on the upper surface of said base at either side of said aperture, one of said film holding means comprising a plate slidably mounted on said upper surface for longitudinal displacement from a normal position into splicing position, an arm pivoted on said base for movement in a plane perpendicular to the longitudinal axis of said base, and capable of being swung from an inoperative position to an operative position in which it overlies said aperture, a projection carried by said arm and adapted to extend into said aperture as said arm is being swung into said operative position, actuating means disposed beneath said upper surface and projecting into the path of said projection and adapted to be engaged thereby to cause displacement of said plate into splicing position as said arm is brought into operative position, a presser member resiliently mounted on said arm and adapted to press together the overlapping edges of two film strips held by said holding means after said plate has been displaced into splicing position, and latching means for holding said arm in operative position.

8. In a film splicer comprising a base provided with a transversely disposed slot dividing the upper surface of said base into two film holding tables, film holding means for each of said tables, and a bracket on said base in substantial alignment with said slot, the combination of a pivoted member mounted on said bracket, an arm mounted on said pivoted member and capable of being swung from an inoperative position to an operative position in which it overlies said slot, swivel means connecting said arm to said pivoted member for permitting said arm to be twisted along its longitudinal axis alternatively into a cutting position, or into a pressing position, a shear blade mounted on said arm and adapted to project into said slot when said arm is twisted into cutting position, and swung into operative position, a presser resiliently mounted on said arm and adapted to bear against one of said film tables at a point immediately adjacent said slot when said arm is twisted into said pressing position and swung into operative position and a scraper slidably mounted on said arm adjacent said shear blade for cooperation with that portion of a film strip disposed on said base which will underlie said presser when said arm is twisted into pressing position, said scraper being operative when said arm is twisted into cutting position and when said shear blade projects into said slot.

9. A film splicer comprising a base provided with a transversely disposed slot dividing the upper surface of said base into two film holding tables, stationary film clamping means on one of said tables, shiftable film clamping means on the other of said tables, a pivoted member pivotally mounted on said base, an arm mounted on said pivoted member and capable of being swung from an inoperative position to an operative position in which it overlies said slot, swivel means connecting said arm to said pivoted member for permitting said arm to be twisted along its longitudinal axis alternatively into a cutting position or into a pressing position, a shear blade mounted on said arm and adapted to project into said slot when said arm is twisted into cutting position and swung into operative position, a presser resiliently mounted on said arm and adapted to bear against one of said film tables at a point immediately adjacent said slot when said arm is twisted into said pressing position, a projection carried by said arm and swung into operative position, and actuating means disposed in the path of said projection and adapted to be engaged thereby only when said arm has been twisted into pressing position for displacing said shiftable film clamping means when said arm is swung into operative position, whereby the edges of a strip of film held on said film tables are caused to overlap before they are engaged by said presser.

10. A film splicer comprising a base having a curved upper surface on which a strip of motion picture film is adapted to be positioned, a slot formed in said curved surface at a point near an edge thereof, a plate removably disposed in said slot and provided with spaced rearwardly projecting lugs, a second plate adapted to overlie a portion of said film table and having a surface curved to conform with the curvature of said film table, said plate being provided with a rearwardly projecting T-shaped portion, the arms of which interlock with said rearwardly projecting lugs, whereby said second plate is hingedly mounted on said base, and a leaf spring disposed in said slot and engaging the rear edge of said T-shaped portion whereby said hingedly mounted second plate will be urged by said spring alternatively into a position in which it contacts said film table, or into a position in which it is disposed substantially perpendicular thereto.

JACK BRISKIN.

REFERENCES CITED

The following references are of record in the file of this patent:

UNITED STATES PATENTS

| Number | Name | Date |
| --- | --- | --- |
| 1,175,449 | Hirsch | Mar. 14, 1916 |
| 1,324,686 | Metzger | Dec. 9, 1919 |
| 1,328,056 | Rosenfeld | Jan. 13, 1920 |
| 1,356,761 | Griswold | Oct. 26, 1920 |
| 1,437,348 | Metzger | Nov. 28, 1922 |
| 1,445,045 | Slipper | Feb. 13, 1923 |
| 1,502,959 | McNabb | July 29, 1924 |
| 1,916,311 | Hayden | July 4, 1933 |
| 1,972,536 | Rohrdanz | Sept. 4, 1934 |

Certificate of Correction

Patent No. 2,460,619. February 1, 1949.

JACK BRISKIN

It is hereby certified that errors appear in the printed specification of the above numbered patent requiring correction as follows:

Column 9, line 17, claim 9, after "position" strike out the comma; line 18, same claim, strike out "a projection carried by said arm" and insert the same in line 19, after the word "position" and before the comma;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*